M. LEIDECKER.

BARBERS' AND DENTAL CHAIRS.

No. 7,320. Reissued Sept. 26, 1876.

Witnesses.
Edwin Scott
A.W.M. Sprague

Inventor.
Michael Leidecker
per R.F. Osgood,
Atty.

N. PETERS, PHOTO-LITHOGRAPHER, WASHINGTON, D. C.

UNITED STATES PATENT OFFICE.

MICHAEL LEIDECKER, OF ROCHESTER, NEW YORK.

IMPROVEMENT IN BARBERS' AND DENTAL CHAIRS.

Specification forming part of Letters Patent No. 102,683, dated May 3, 1870; reissue No. 7,320, dated September 26, 1876; application filed June 6, 1876.

*To all whom it may concern:*

Be it known that I, MICHAEL LEIDECKER, of the city of Rochester, in the county of Monroe and State of New York, have invented a certain new and useful Improvement in Barber and Dental Chairs, of which the following is a specification:

This invention consists of a new and improved arrangement for adjusting the angle of the chair.

Figure 1:
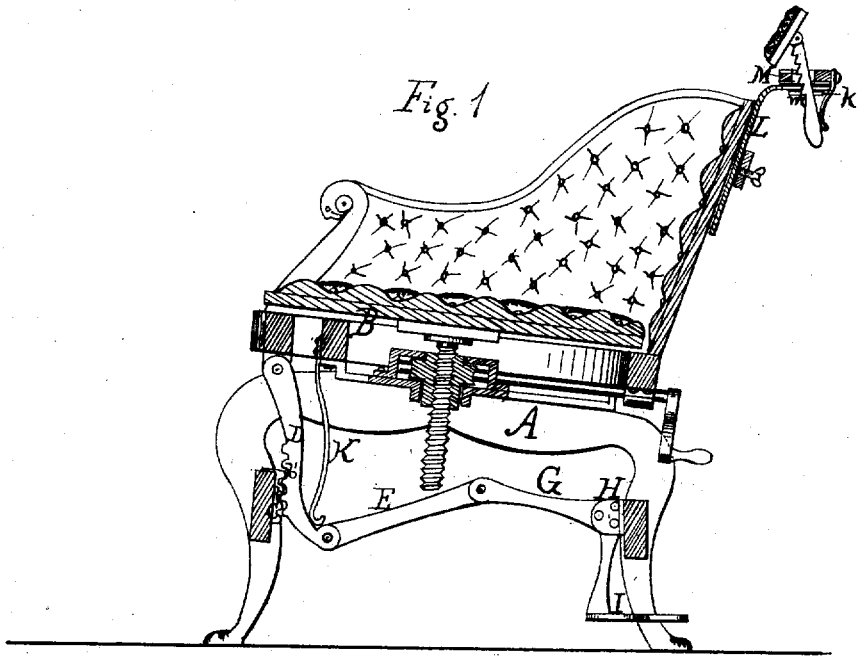
Figure 2:
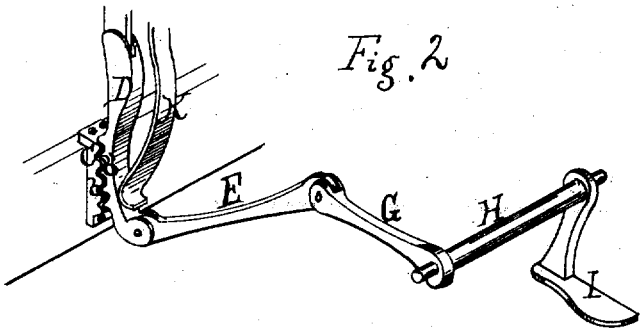
Figure 3:
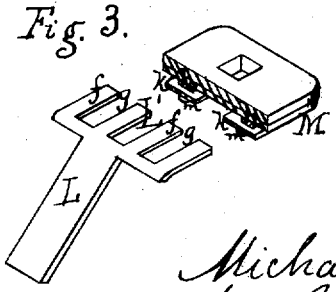

In the drawings, Figure 1 is a sectional elevation. Fig. 2 is a perspective view of the parts for adjusting the angle of the chair. Fig. 3 is a similar view of the parts for adjusting the head-rest.

A is the base of the chair, and B the seat, pivoted to the base, so as to turn to any desired angle. To the front cross-piece of the base is rigidly secured a catch-block, C, and to the bottom of the seat-frame is pivoted a depending arm, D. These parts have, respectively, teeth *b b'*, which engage together, those on the arm being of considerable extent, to allow the desired adjustment. To the lower end of the arm is pivoted a toggle-arm, E, connected, at the opposite end, with an arm, G, which forms a rigid extension of shaft H. The latter has journals, which are set in suitable bearings in the frame of the base, and has depending from it a foot-pedal, I, by which the parts are operated. This pedal comes at the rear of the chair, where the operator stands, and at the right-hand side, where it is most convenient to his reach. On the back side of the arm D rests one or more flat springs, K, attached at the top to the seat-frame, and pressing against the arm, as clearly shown. Foot-levers and ratchets are in common use for this purpose, but, as ordinarily arranged, are not equivalent to my device. I am enabled to make the engagement at the front of the chair, and centrally, and at the same time carry the jointed connection across to the rear of the chair, and to the right-hand corner. This brings the operating parts at the right position for the operator, and also enables the old form of the pivoted seat and base of the chair to be employed without the use of ball-and-socket joints.

The spring or springs K, combined with the arm D, have a special advantage aside from keeping the parts in engagement, inasmuch as a degree of stiffness and resistance is imparted to the back action of the disengaging arrangement clear through to the pedal.

The head-rest standard L has its top spread into a broad lateral bearing, L', Fig. 3. This is divided into a series of parallel forks or arms, *f f f*, projecting backward in line with the chair, and having equal spaces *g g* between them. The bottom of the head-rest has a metallic plate, M, with two ways or ribs, *h h*, standing out from the face, and of such size and of such distance apart as to enter two of the slots *g g* between the forks *f f*, closely filling the space. On the faces of these ways rest clamp-lugs *k k*, overlapping the forks *f f*, to which they clamp, to hold the head-rest in place, by means of screws *m m*.

By setting the head-rest out or in more or less, I can get the longitudinal adjustment, and, by drawing out and inserting in other positions, I attain the desired lateral adjustment. This arrangement, while it allows the desired adjustments, holds the head-rests in position much more securely than in other arrangements, as no slipping or sliding can occur.

I am aware that a quadrant has been attached on the under side of the chair-seat, engaging with a foot-lever projecting back to the rear of the chair. I am also aware that a spring-rod, engaging with a notched arm, has been used for adjusting the inclination of the chair. Such I do not claim.

What I claim, and desire to secure by Letters Patent, is—

1. In a barber or dental chair, the combination, with the base A and body B, of a jointed or pivoted lever-connection, extending across the bottom of the chair, provided with a foot-pedal, I, at the rear, in convenient position to be operated by the foot, and connected at the front with the ratchet, in such a manner as to disconnect the ratchet, to adjust the inclination of the chair when pressure is applied to the foot-pedal, as herein described.

2. The toothed block C, arm D, spring or springs K, toggle-arms E G, shaft H, and pedal I, combined with the parts A B of the chair, in the manner described, and for the purpose specified.

3. The foot-pedal constructed with the offset shaft H, in combination with the jointed connection E G, so arranged that while the foot-pedal comes at the right-hand corner of the chair the jointed connection extends centrally across the chair, as herein shown and described.

In witness whereof I have hereunto signed my name the 25th day of May, 1876, in the presence of the two subscribing witnesses.

MICHAEL LEIDECKER.

Witnesses:

R. F. OSGOOD,

EDWIN SCOTT.